Oct. 25, 1932.  A. B. WILSON  1,884,463
HARROW
Filed Aug. 16, 1929  3 Sheets-Sheet 3

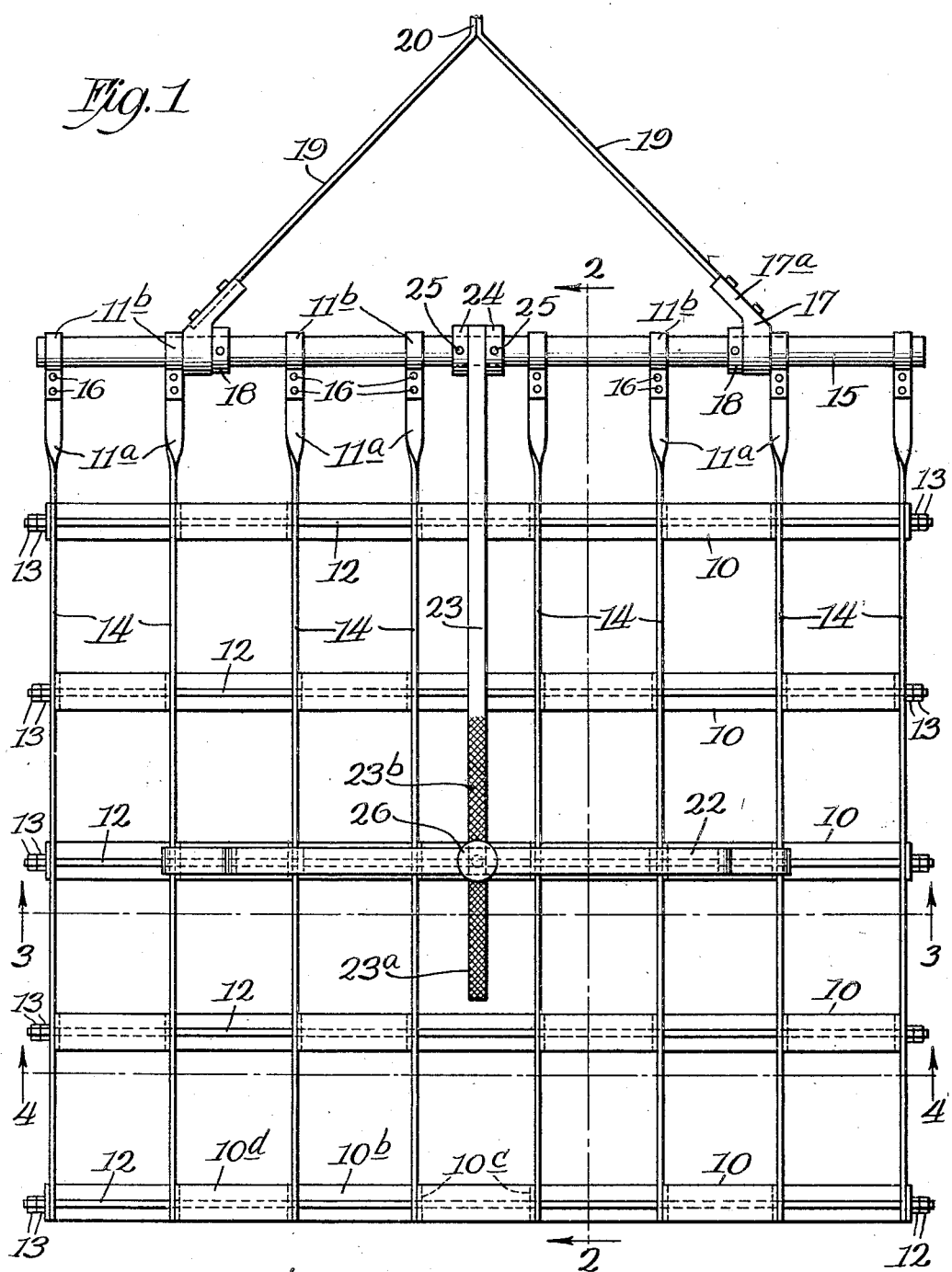

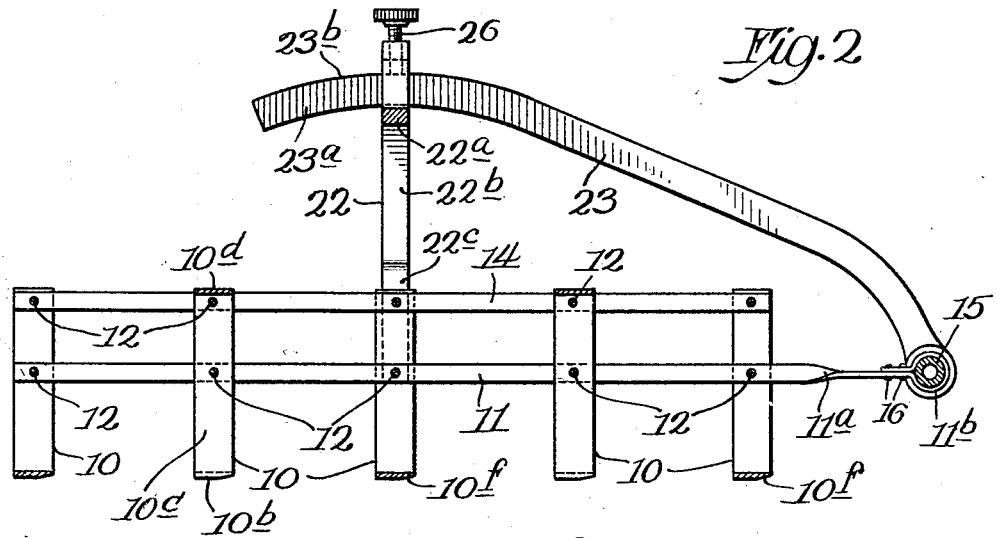
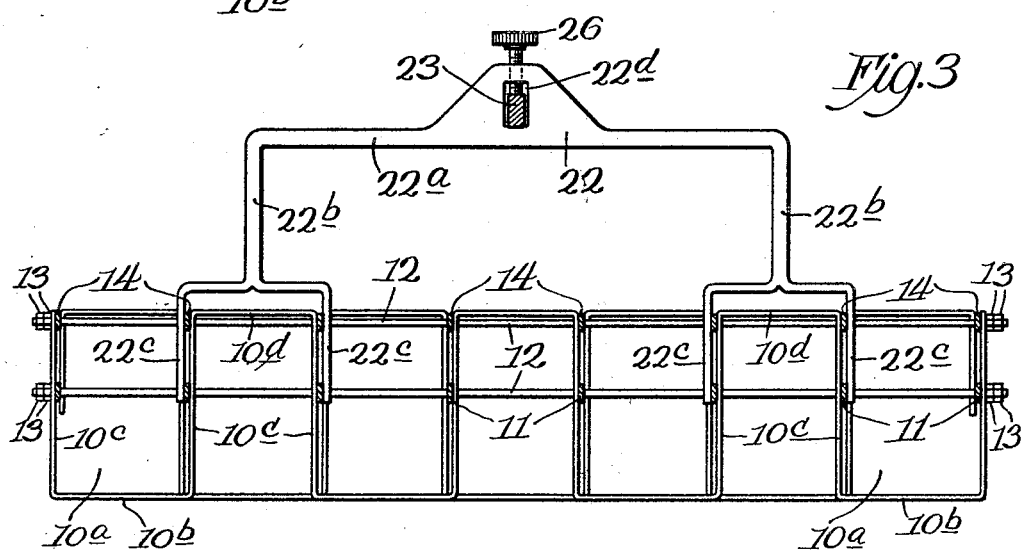
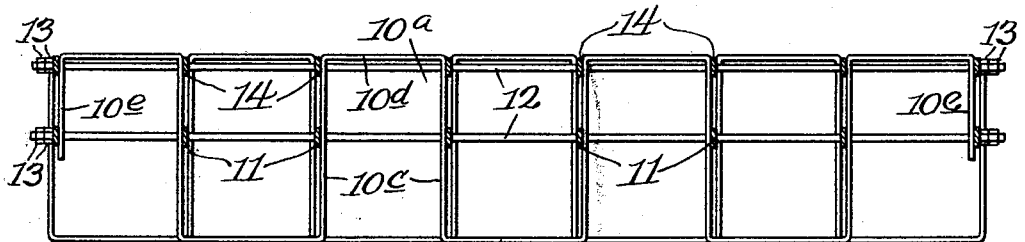

Inventor
Allen B. Wilson
By Rector, Hibben, Davis & Macauley Attys.

Patented Oct. 25, 1932

1,884,463

UNITED STATES PATENT OFFICE

ALLEN B. WILSON, OF CHICAGO, ILLINOIS

HARROW

Application filed August 16, 1929. Serial No. 386,466.

This invention relates to improvements in harrows or cultivators and its purpose is to provide a device of this kind which may preferably be dragged along the ground to cultivate the earth preliminary to the planting of grain or the like or for the purpose of cultivating the earth between rows of plants. The principal object of the invention is to provide an improved harrow of simple design which may be readily manufactured at comparatively small cost and which may be readily repaired. A further object of the invention is to provide a harrow comprising a plurality of similar units arranged to succeed each other in their travel along the ground and having the earth-engaging portions thereof arranged in staggered relation in succeeding units. A further object of the invention is to provide a harrow comprising a plurality of cultivating units each formed of a strip of sheet steel bent to form a number of convolutions having the lower portions thereof sharpened to engage the earth. Still another object of the invention is to provide a harrow embodying a number of similar units each capable of being readily removed or replaced. A further object of the invention is to provide an improved form of cultivator having a plurality of earth-engaging units arranged to follow each other in succession and having means for varying their relative inclinations to the surface of the ground for the purpose of regulating the depth to which the earth is cultivated. Other objects relate to various features of construction and arrangement which will appear more fully hereinafter.

The nature of the invention will be understood from the following specification taken with the accompanying drawings, in which one embodiment is illustrated. In the drawings, Fig. 1 shows a top plan view of a harrow embodying the features of the present invention;

Fig. 2 shows a longitudinal section taken on the line 2—2 of Fig. 1;

Fig. 3 is a transverse section taken on the line 3—3 of Fig. 1;

Fig. 4 is a transverse section taken on the line 4—4 of Fig. 1;

Fig. 5 is a detail section taken through the lower part of one of the earth-engaging convolutions of a cultivator unit, showing the sharpened earth-engaging member formed by the lower part of the convolution;

Figure 6:
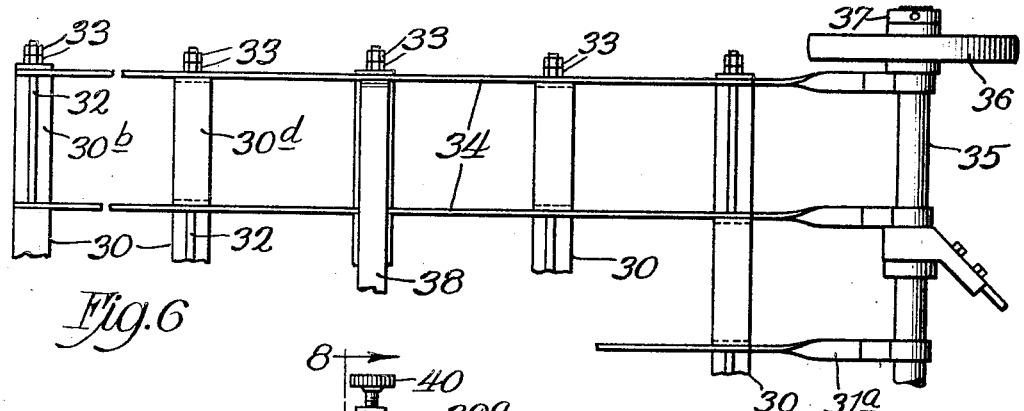
Fig. 6 shows a partial top plan view of a modified form of the invention in which the forward end of the harrow is supported by wheels.

As illustrated in the drawings, the invention comprises a number of cultivator units 10 which extend parallel to each other transversely of the harrow and which are arranged to follow each other in succession as the harrow is dragged along the surface of the ground by any suitable propelling means. These units 10 comprise a number of substantially U-shaped convolutions 10$^a$ each having a lower horizontal cross member 10$^b$ connected at its ends with a pair of upwardly extending members 10$^c$. The members 10$^c$ of adjacent convolutions are connected at their upper ends by the upper horizontal members 10$^d$. The convolutions 10$^a$ and the connecting members 10$^d$ of each unit are thus formed as one integral construction which is preferably formed by bending an elongated steel strip of suitable width into the form illustrated in Figs. 3 and 4. The convolutions 10$^a$ of the units 10 are arranged in staggered relation so that the lower cross members 10$^b$ of the convolutions of one unit cultivate the spaces between the convolutions 10$^a$ of the next preceding unit as the harrow travels over the surface of the ground. Each alternate unit of the cultivator, therefore, has the form shown in Fig. 3, comprising a complete convolution 10$^a$ at each end of the unit, while all of the intermediate units 10 have the form shown in Fig. 4, where the connecting members 10$^d$ attached to the outer units are connected with short downwardly extending members 10ᵉ at their outer ends to align with the side walls 10ᶜ of the outer convolutions of the next adjacent units 10. The lower cross members 10ᵇ of the convolutions 10ᵃ are sharpened, preferably on their under sides, as shown at 10ᶠ, along their forward edges, so that as the harrow is dragged over the ground, these sharpened edges dig into the earth and effect the desired stirring up and cultivation thereof, while at the same time cutting off any weeds which are growing between the rows of plants being cultivated.

The units 10 of the cultivator are connected longitudinally of the machine by a lower series of parallel bars 11 which engage the intermediate portions of the side walls 10ᶜ and are connected thereto by transverse rods 12. These rods 12 extend transversely through all of the bars 11 and the threaded ends thereof are engaged by a pair of nuts 13 so that the rods may be withdrawn to permit the attachment of any unit 10. The upper ends of the side walls 10ᶜ of the harrow units 10 are connected by another series of longitudinal bars 14 and another series of transverse rods 12 engage these bars and the side walls 10ᶜ and 10ᶜ to form pivotal connections between the upper ends of the convolutions 10ᵃ and the bars. The lower series of bars 11 extend forwardly beyond the forward unit 10 as shown at 11ᵃ and they have parts 11ᵇ thereof bent around a tubular transverse member 15 with the extremities of the parts 11ᵇ united with the parts 11ᵃ thereof by means of rivets 16 or by welding or other fastening means. The units 10 of the harrow thus have a pivotal connection with the bars 11 and also with the bars 14 so that upon relative movement of these two series of longitudinal bars, the inclinations of the convolutions 10ᵃ and of the earth-engaging portion 10ᵇ thereof, with respect to the earth, may be varied. The transverse bar or frame member 15 is provided with brackets 17 which are rotatably mounted thereon and secured in place adjacent two of the members 11 by collars 18. The forward portions 17ᵃ of the brackets 17 converge inwardly and forwardly and are secured to the converging draft members 19 which are adapted to have their forward ends secured at 20 to a draw bar or the like adapted to be hitched to a tractor or other propelling means. Due to the staggered relation of the convolutions of succeeding units 10, the members 11 and 14 which engage the side walls 10ᶜ are properly spaced apart by engagement with these side walls without the employment of other spacing means.

For the purpose of permitting the harrow units 10 to be tilted about their pivotal connections on the members 11 and to maintain them in adjusted angular position, a tilting frame 22 is provided in alignment with the central cultivator unit 10 and means are provided for tilting this frame and thereby tilting all of the units 10 simultaneously. The frame 22 comprises an upper transverse member 22ᵃ having a pair of downwardly extending arms 22ᵇ each of which is divided and terminates in a pair of parallel extensions 22ᶜ which extend downwardly on opposite sides of the adjacent side walls 10ᶜ of two adjacent convolutions 10ᵃ. These arm extensions 22ᶜ are pivotally engaged by one rod 12 of both the upper and lower series so that if the frame 22 is tilted longitudinally of the harrow, it tilts the central unit 10 and also all of the other units 10 because of the connections established through the bars 11 and 14. For the purpose of facilitating this tilting operation and to enable the parts to be held in adjusted position, the upper cross bar 22ᵃ of the tilting frame is provided with a slot 22ᵈ which is slidably engaged by a lever 23. This lever inclines downwardly and forwardly and has its forward end pivotally engaged by the transverse frame member 15 at the middle point thereof, being held against lateral movement by a pair of collars 24 which are secured on the member 15 by a pair of pins 25. The rear extremity of the lever 23 is curved as shown at 23ᵃ to correspond to the arc of the tilting movement of the frame 22 and the upper surface of this part 23ᵃ is corrugated or otherwise roughened as shown at 23ᵇ for engagement by a set screw 26 which threadedly engages the upper part of the wall of the slot 22ᵈ as shown in Fig. 3. Having released the set screw 26, the operator may throw the lever forwardly or pull it in the reverse direction in order to bring about the desired inclination of the unit 10 and then the set screw may be tightened to hold the parts in that adjusted position during the subsequent operation of the harrow in cultivating the earth.

It will be apparent that the cultivator units 10 may be readily formed from strip steel of suitable width and gauge merely by bending the same to form a number of integrally connected convolutions having lower horizontal members which may readily be sharpened to dig into the earth. By changing the inclinations of the convolutions and of the cutting blades 10ᵇ thereof with respect to the surface over which the harrow travels, the depth to which the members 10ᵇ dig into the earth may be varied as desired. If the edges 10ᶠ become dull or if any unit of the cultivator becomes excessively worn or otherwise damaged, it may readily be removed for sharpening or replacement merely by detaching the two rods 12 which connect that unit with the bars 11 and 14.

Figure 7:
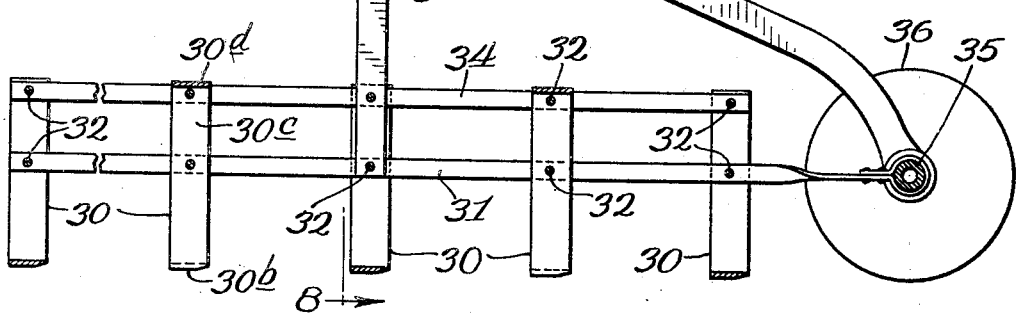
Fig. 7 is a longitudinal section through the modified form of construction shown in Fig. 6.
Figure 8:
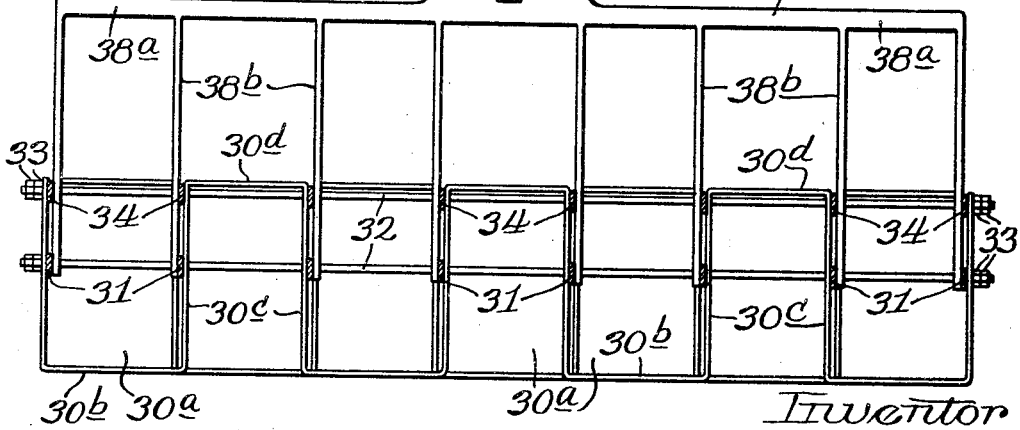
Fig. 8 is a transverse vertical section taken on the line 8—8 of Fig. 7.

In Figs. 6, 7 and 8 of the drawings there is illustrated a modified form of the invention in which means are provided for supporting the forward end of the harrow on wheels. In this form, the harrow is made up of a number of transverse units 30 each comprising a plurality of substantially U-shaped convolutions 30ª formed by bending a bar of steel or the like transversely to its length. These convolutions have lower transverse earth-engaging parts 30ᵇ which are preferably sharpened along their forward edges and which are carried by the side walls 30ᶜ. The side walls 30ᶜ of adjacent convolutions are connected by the upper transverse parts 30ᵈ. The units 30 are connected by a lower series of longitudinal bars 31 which are attached to the harrow units by transverse pivot rods 32 engaged at their ends by nuts 33. The forward ends 31ª of the bars 31 extend beyond the forward unit 30 and are secured to a transverse tubular bar or frame member 35. The bar 35 is rigidly secured to the members 31 and serves as an axle projecting beyond the bars 31 and having supporting wheels 36 rotatably mounted thereon. These wheels are retained in place by collars 37 secured on the axle or frame member 35 and they serve to support the forward end of the harrow during its travel. The upper portions of the harrow units 30 are connected by another longitudinal series of bars 34 which are connected to the upper ends of the side walls 30ᶜ by another series of pivot rods 32 having nuts 33 detachably secured on the ends thereof. The bars 31 and 34 serve to space the units 30 apart longitudinally of the machine and they are spaced apart by the side walls of the convolutions due to the staggered relation of the convolutions of successive units, which causes the convolutions of one unit to move in a path extending between the paths of the convolutions of the next adjacent units.

In the form of construction shown in Figs. 6, 7 and 8, the inclinations of the convolutions 30ª and of the earth-engaging portions 30ᵇ thereof, with respect to the surface of the earth, may be varied, as in the first form of the invention, by means of a tilting frame 38 comprising a transverse bar 38ª having a number of downwardly extending arms 38ᵇ, one of which is located adjacent to each of the side walls 30ᶜ of the convolutions of the intermediate unit 30. The arms 38ᵇ are pivotally engaged by both of the rods 32 which pass through the side walls of the convolutions of the intermediate unit 30 so that when the tilting frame 38 is rocked in a plane extending longitudinally of the harrow, the upper series of bars 34 are moved with respect to the lower series of bars 31 and the inclinations of the cutting blades 30ᵇ are thereby varied. The upper transverse bar 38ª of the tilting frame is provided with an enlarged part 38ᶜ having an aperture 38ᵈ therethrough. This aperture is engaged by the curved portion 39ª of a lever 39 which has its forward end pivotally mounted on the bar or axle 35. When the units 30 have been adjusted in the proper angular position, the tilting frame 38 may be secured to the lever 39 by means of a set screw 40 which passes through the upper wall of the slot 38ᵈ and engages the upper side of the lever 39. In this form, the supporting wheels 36 are adapted to maintain a more or less uniform elevation of the forward end of the harrow and as it is moved along the ground, the successive units 30 are adapted to dig progressively into the earth to an increasing extent in order to bring about a finely divided condition of the earth and to cut off the weeds in the field under cultivation.

Although two forms of the invention have been shown and described by way of illustration, it will be understood that it may be constructed in various other embodiments within the scope of the appended claims.

I claim:

1. A harrow comprising a self-sustaining cultivator unit formed by bending a single metal bar into a plurality of spaced convolutions having their lower parts sharpened to enter the earth.

2. A harrow comprising a self-sustaining cultivator unit formed by bending a single metal bar into a plurality of spaced convolutions having their lower forward edges sharpened on their under sides.

3. A harrow comprising an integral transverse cultivator unit formed by bending a single metal bar into a plurality of connected substantially U-shaped convolutions having the lower transverse portion of each convolution sharpened on its under side.

4. A harrow comprising a self-sustaining cultivator unit formed by bending an integral metal bar into a plurality of spaced convolutions extending downwardly and having their lower parts adapted to enter the earth, and means for varying the inclination of the earth-engaging portions of said convolutions with respect to the surface of the earth.

5. A harrow comprising a plurality of parallel cultivator units extending transversely of the harrow and each provided with a number of downwardly extending U-shaped convolutions adapted to enter the earth, a plurality of longitudinally extending bars having pivotal connections with said convolutions, and means for effecting relative adjustment of said longitudinal bars for the purpose of varying the inclination of said convolutions with respect to the earth.

6. A harrow comprising a plurality of parallel transversely extending cultivator units each formed by bending a metal bar into a number of spaced downwardly extending convolutions, the convolutions of each bar being arranged in staggered relation with respect to the convolutions of the next adjacent bars, a series of longitudinally extending bars engaging the convolutions of said cultivator units, and means for forming detachable pivotal connections between said longitudinal bars and said cultivator units.

7. A harrow comprising a plurality of parallel transversely extending cultivator units each formed by bending a metal bar into a number of spaced downwardly extending convolutions, the convolutions of each bar being arranged in staggered relation with respect to the convolutions of the next adjacent bars, a series of longitudinally extending bars engaging the convolutions of said cultivator units, and a series of transverse rods each pivotally engaging said longitudinal bars and the side walls of the convolutions of one cultivator unit.

8. A harrow comprising a plurality of parallel transversely extending cultivator units each formed by bending a metal bar into a number of spaced downwardly extending convolutions, the convolutions of each bar being arranged in staggered relation with respect to the convolutions of the next adjacent bars, a series of longitudinally extending bars engaging the convolutions of said cultivator units, a series of transverse rods each pivotally engaging said longitudinal bars and the side walls of the convolutions of one cultivator unit, and means for detachably securing said rods in place.

9. A harrow comprising a plurality of parallel transversely extending cultivator units each formed by bending a metal bar to form a plurality of downwardly extending U-shaped convolutions adapted to enter the earth, an upper series and a lower series of bars extending longitudinally of the harrow and engaging the sides of said convolutions, a plurality of transversely extending rods pivotally engaging said longitudinal bars and the side walls of said convolutions, and means for effecting relative longitudinal movement of the longitudinal bars of one of said series with respect to those of the other series for the purpose of varying the inclinations of said convolutions with respect to the earth.

10. A harrow comprising a plurality of cultivator units, each made up of a plurality of convolutions having parts adapted to engage the earth, a forward transverse frame member, means for connecting said transverse frame member to said cultivator units, and wheels for supporting said transverse frame member.

11. A harrow comprising a plurality of transversely extending cultivator units each formed by bending a single bar of metal into a plurality of spaced convolutions having their lower parts adapted to enter the earth, means pivotally engaging the side walls of said convolutions in each cultivator bar, and means for tilting said cultivator bars about said pivotal points to vary their inclinations with respect to the surface of the earth.

12. A harrow comprising a plurality of cultivator units, each formed by bending a single metal bar into a plurality of spaced convolutions of U-shaped form having their lower parts adapted to enter the earth, longitudinally extending members having pivotal engagement with the side walls of convolutions in each of said cultivator units, and means for effecting relative longitudinal movement of said longitudinal members for the purpose of changing the inclination of said cultivator units with respect to the surface of the earth.

In testimony whereof, I have subscribed my name.

ALLEN B. WILSON.